March 8, 1927.

H. DALTON 1,620,522

COMBINED LATHE, DRILLING, AND MILLING MACHINE

Filed June 10, 1921 4 Sheets-Sheet 1

INVENTOR
Hubert Dalton
BY C. P. Goepel
ATTORNEY

March 8, 1927. 1,620,522
H. DALTON
COMBINED LATHE, DRILLING AND MILLING MACHINE
Filed June 10, 1921 4 Sheets-Sheet 2
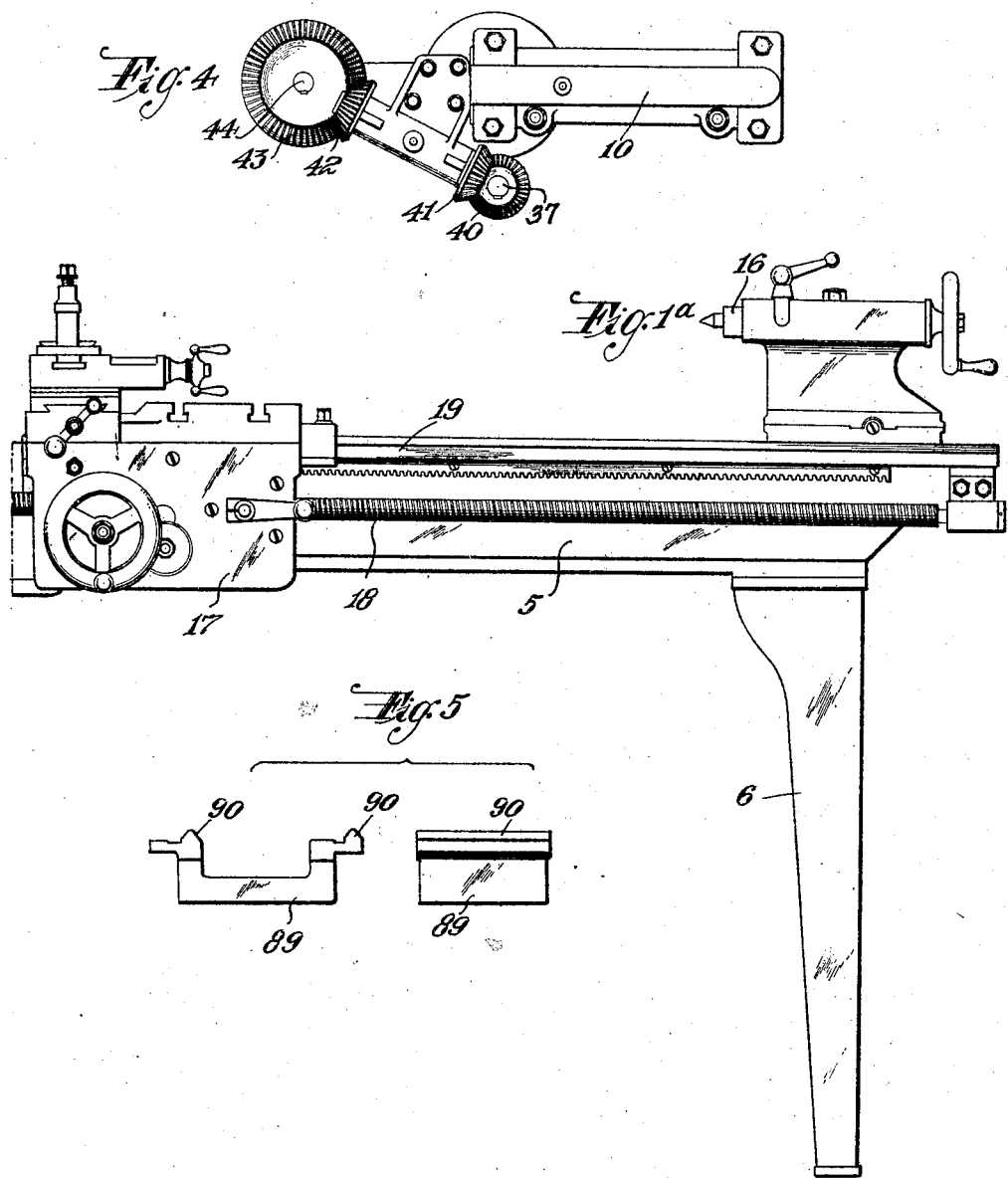
INVENTOR.
Hubert Dalton
BY C. P. Gochel
ATTORNEY.

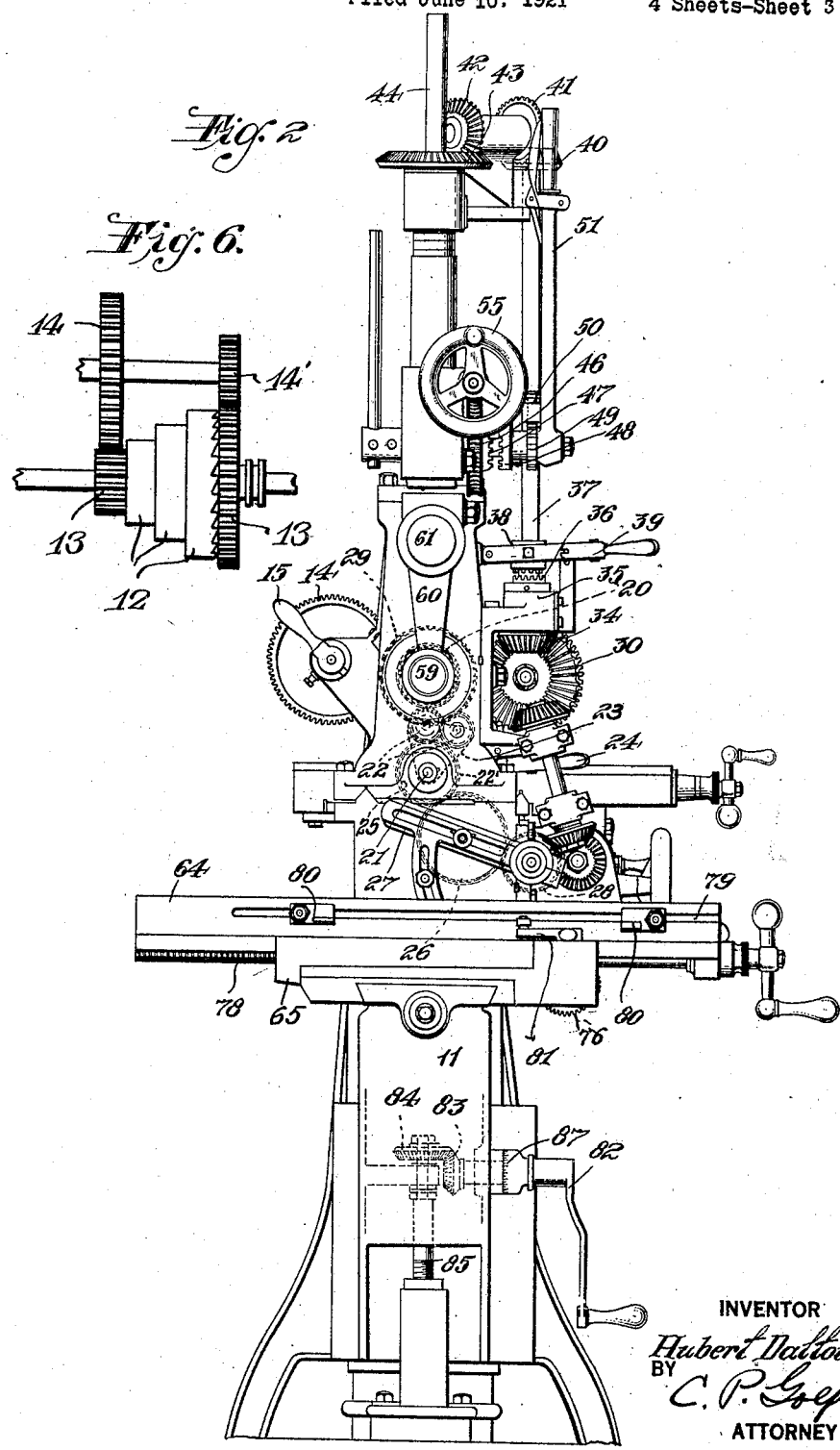

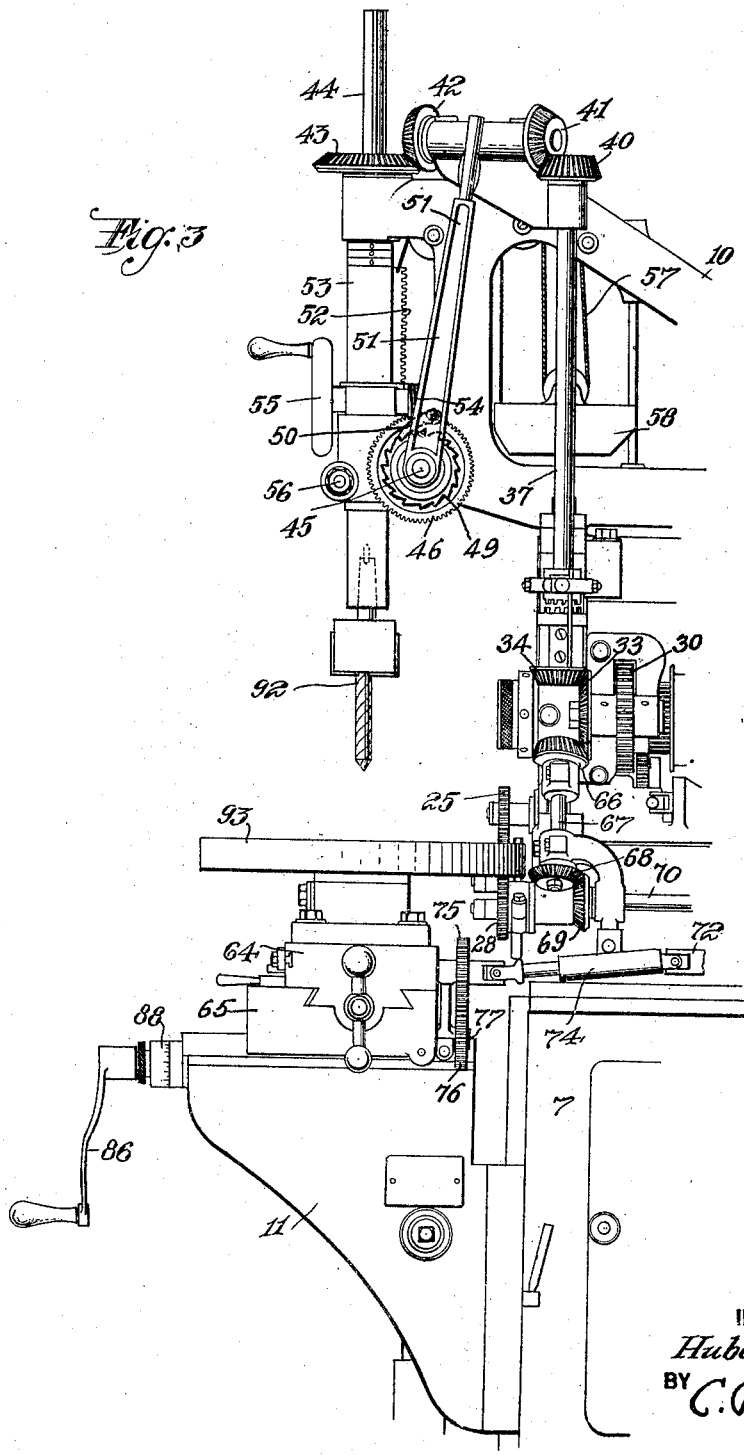

Patented Mar. 8, 1927.

1,620,522

UNITED STATES PATENT OFFICE.

HUBERT DALTON, OF NEW YORK, N. Y.

COMBINED LATHE, DRILLING AND MILLING MACHINE.

Application filed June 10, 1921. Serial No. 476,393.

This invention relates to a combined lathe, drilling and milling machine and in its generic aspect contemplates the provision of a metal working machine upon which a plurality of operations upon different pieces of work may be simultaneously carried on and which is so constructed that the machine will occupy a minimum of floor space.

More particularly, the present invention comprehends the provision of a mechanism whereby the several units comprised in the machine organization may be operated from a common driving shaft.

It is also one of the objects of the invention to provide improved means for quickly converting the machine for use from a horizontal milling machine to a vertical milling or drilling machine, or vice versa.

In one embodiment of the invention I propose to provide the lathe bed with a detachable section adjacent to the head stock which may be readily removed when it is necessary to attach a work supporting plate to the head stock spindle.

With the above and other objects in view, the invention consists in the improved combination and arrangement of the several coordinated parts of the machine as will be hereinafter more fully described, illustrated in the accompanying drawings and subsequently incorporated in the subjoined claims.

In the drawings wherein I have illustrated one practical and satisfactory embodiment of the invention and in which similar reference characters designate corresponding parts throughout the several views:

Figures 1 and 1ª represent the complete machine in side elevation;

Figure 2 is a front elevation of the machine;

Figure 3 is a fragmentary side elevation showing the machine arranged for use as a drill press;

Figure 4 is a top plan view, and

Figure 5 is a detail view showing the detachable section of the lathe bed in end and side elevation.

Figure 1:
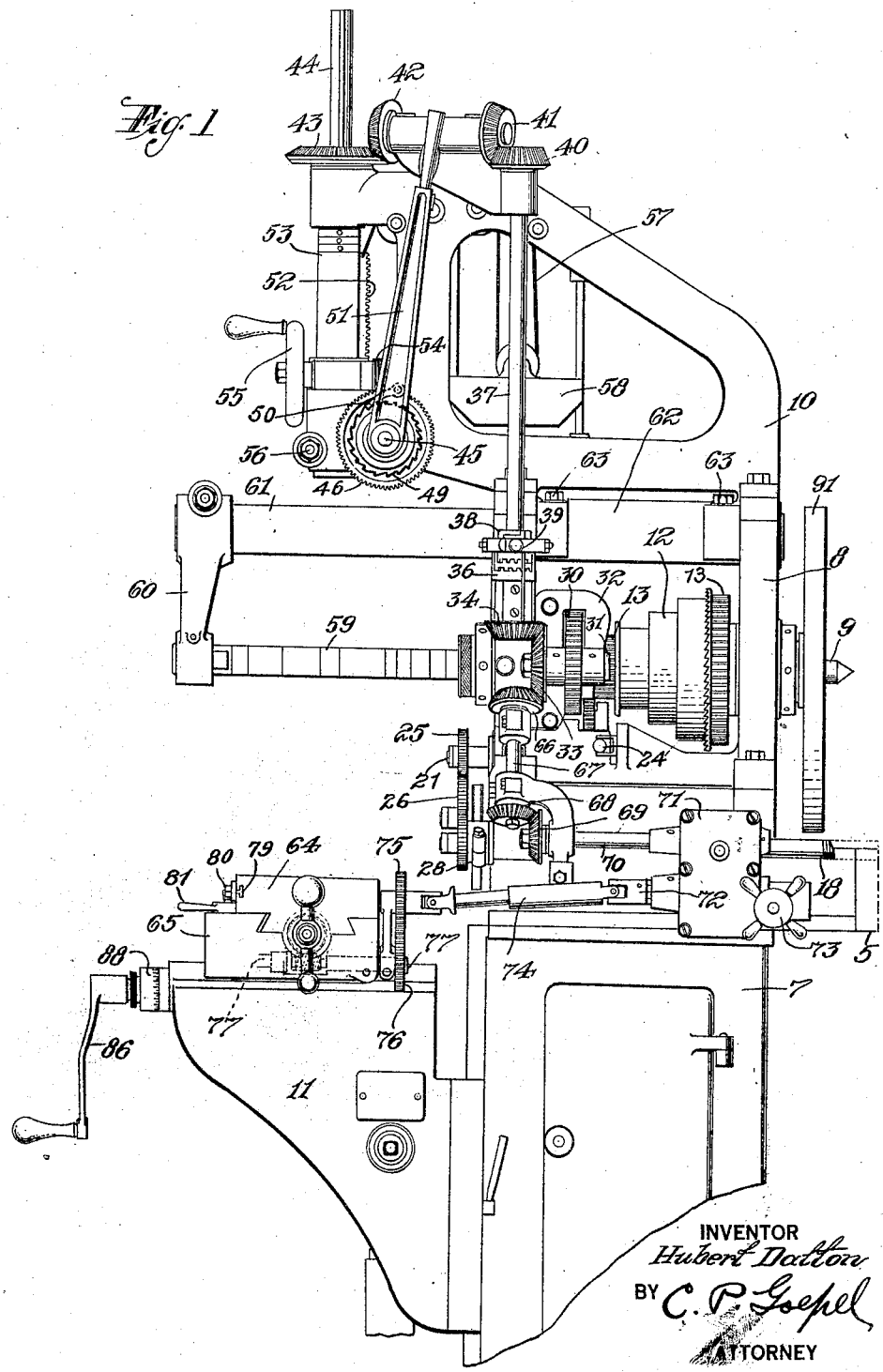

Referring in detail to the drawings, 5 designates the lathe bed which is supported at one of its ends by the leg 6 of standard form and at its other end by a box-like column 7. Upon the latter end of the lathe bed the head stock 8 is secured and in this head stock, the spindle 9, together with the driving mechanism for the several machine units, is mounted. Upon the head stock 8 there is secured a frame 10 in which the operating mechanism for the vertical drill press spindle and the vertical milling spindle is mounted.

Upon the front side of the supporting column 7 the milling machine knee 11 is attached and on said knee the table and operating mechanism for the horizontal milling machine is mounted, the said table, as will be later explained, also constituting a work support in the operation of the vertical drill press and the vertical milling spindle.

The several mechanisms may be operated through the medium of an ordinary drive belt from an overhead countershaft, said belt transmitting power to the stepped pulley 12 on the spindle 9. As shown, the pulley 12 affords three changes of driving speed and in addition thereto, three changes of speed may be secured by means of the gears 13 with which gears 14 and 14' mounted on an eccentric shaft 15' may be thrown into mesh by actuating the handle 15 fixed to one end of the eccentric shaft. The gear 13 on the right, shown in Figure 6, is keyed upon the shaft so that it can be moved longitudinally thereon and operated by any form of lever cooperating with grooved member 13' carried by the gear 13, and is free of the pulley 12 but provided with ratchet teeth on its inner face adapted to cooperate with the ratchet teeth 12' carried by the pulley whereby the gear is engaged or disengaged with the pulley. The left hand gear 13, Figure 6, is fixed to the pulley 12. Thus a total of six speed changes may be obtained, though it is apparent that the number of such speed changes may be further increased or decreased as the particular case might demand or require.

The lathe includes a tail stock 16 having its spindle axially aligned with the spindle 9, while upon the bed of the lathe the tool carriage 17 with its cross slide is mounted for longitudinal movement along the bed of the lathe, through the medium of the lead screw 18, upon the guide rails 19.

The power for operating the lathe is obtained from the pulley 12. Upon the spindle 9 a main driving gear 20 is fixed, said gear driving the shaft 21 through the medium of a pair of gears 22 meshing with each other and mounted upon an arm 23 loosely engaged on the shaft 21. This arm is actuated by means of the lever 24 to position either of the gears 22 in operative relation with the gear 20 and with the gear 22' for driving the shaft 21 in reverse directions. On the other hand, the lever 24 may be moved to dispose the gears 22 in neutral position so that the shaft 21 will not be driven.

Upon the forward end of the shaft 21, a gear 25 is fixed and drives a gear 26 detachably mounted on the arm 27, said gear in turn meshing with the gear 28 on the end of the lead screw 18. The arm 27 is loosely mounted upon the bearing for the lead screw and is slotted as shown, so that transmission gears 26 of different diameters may be mounted upon said arm and engaged with the gears 25 and 28 to drive the lead screw at a desired speed. By means of the lever 24, the gears 22 may be positioned so as to drive the tool carriage of the lathe longitudinally in either direction.

Upon the spindle 9 a drive gear 29 is fixed and meshes with a similar gear 30 fixed on an auxiliary shaft 31 mounted in a suitable bearing 32 secured upon the head stock 8. Upon this shaft a beveled gear 33 is fixed, said gear at its upper side meshing with the beveled gear 34 on the lower end of a sleeve mounted in the bearing 35. The upper end of the sleeve is provided with clutch teeth 36. The lower end of a vertically disposed shaft 37 has the clutch member 38 keyed thereon for longitudinal movement. This clutch member is actuated by the hand lever 39. It will be apparent that in the movement of this lever in one direction the teeth of the clutch member 38 are engaged with the clutch member 36 so that the shaft 37 will be positively driven. This shaft transmits power through the medium of the gears 40 and 41 to a horizontal shaft mounted upon the upper end of the frame 10, which in turn, transmits power through the meshing gears 42 and 43 to a vertically movable spindle 44. The gear 43 is provided with a keyway to receive a longitudinally extending key on the spindle 44 so that the spindle is rotated with said gear while permitting of the free longitudinal movement of the spindle.

In the frame 10 a shaft 45 is mounted and upon said shaft the worm gear 46 is loosely engaged, said gear having a clutch face 47 to be engaged by a complementary clutch sleeve 48 keyed upon the shaft 45. One end of this sleeve has a ratchet 49 thereon adapted for engagement by a dog 50 mounted on the lever 51 which is loosely engaged on one end of the shaft 45. The worm gear 46 has a hub sleeve which carries a pinion meshing with the rack 52 on the sleeve 53 in which the spindle 44 is loosely engaged. A worm 54 operated by the hand wheel 55 is engaged with the upper side of the gear 46. It will thus be apparent that when the clutch member 48 is in the position seen in Figure 2 of the drawings, the rack mechanism will be actuated by means of the hand wheel 55. When, however, this sleeve is shifted to engage its clutch teeth with the clutch teeth 47, the rack mechanism for moving the spindle 44 may be operated by means of the lever 51.

When the machine is to be operated as a vertical milling machine spindle 44 is lowered to the desired position by operating the hand wheel 55 and the clamping bolt 56 is then adjusted to tightly clamp the spindle sleeve 53 to the frame 10 so that said sleeve is rigidly held in a stationary position. The shaft or spindle is counterbalanced by means of a cable or chain indicated at 57 which is connected to a counterweight 58 guided in the frame 10, one end of the cable or chain being connected to the machine frame and the other end thereof being connected to the upper end of the sleeve 53.

When the machine is used as a horizontal milling machine, one end of a driving arbor 59 which is hollow and has its opposite ends tapered is securely clamped in the shaft extension of the spindle 9. On this arbor various sizes of milling cutters may be attached. The outer end of the arbor 59 is journaled in an arm 60 fixed upon the end of an overhanging rod or shaft 61 which is longitudinally movable in the bored or tubular part 62 of the head stock 8.

When using the machine as a drill press or vertical milling machine, the arbor 59 is detached while the rod or shaft 61 with the supporting arm 60 are either removed or pushed inwardly toward the head stock and secured by means of the clamp screws 63.

The table or work bed 64 for the milling machine is mounted for longitudinal movement upon a carriage 65 which is supported upon a bed or rails on the knee 11. The power for operating this work table is transmitted from the main driving spindle 9 through the medium of the gears 29, 30, and 33, the latter gear meshing at its lower side with a beveled gear 66 fixed upon the upper end of a shaft 67. On the lower end of the said shaft a similar beveled gear 68 is fixed and meshes with the gear 69 secured upon the end of the shaft 70. This shaft is operatively connected through suitable change speed gearing housed in the box 71 to a shaft section 72. As the particular nature of this change speed gearing whereby the work table may be moved at varying speeds constitutes no essential feature of the present invention, it will not be herein disclosed in detail. It will suffice to state that this gearing may be controlled and the several speed changes readily made by the operation of a hand wheel 73. A flexible power transmitting shaft 74 connects the shaft section 72 to the gear 75. This flexible shaft 74 consists of several sections keyed for relative longitudinal sliding movement and having universal joint connections to the shaft section 72 and gear 75 respectively to permit of the flexible shaft assuming various angles in the vertical adjustment of the supporting knee 11. The gear 75 is engaged with the gear 76 secured to one end of a shaft 77 on which a worm is fixed and has meshing engagement with a worm gear secured upon the table feed screw 78. The front side of the work table 64 is provided with a longitudinally extending slot 79 in which relatively adjustable trip dogs 80 are mounted. These dogs are adapted to engage a trip lever 81 at the opposite ends of the travel of the work table to automatically reverse the direction of travel of the work table. This automatic control means for the travel of the work table does not, however, constitute an essential part of the present invention and further detail reference thereto is unnecessary.

The knee 11 may be vertically raised or lowered by means of the crank 82 the shaft of which is provided with a beveled gear 83 meshing with a similar gear 84 on the upper end of the jackscrew 85, said screw being threaded into a sleeve fixed upon the machine base.

The cross or transverse movement of the work table upon the knee 11 is secured through the medium of a suitable feed screw operated by the crank handle 86, said screw having threaded engagement with a part of the cross slide bed 65 upon which the longitudinally movable table 64 is mounted. Preferably, the index dials 87 and 88 respectively, are provided whereby the operator can accurately position the knee 11 or adjust the work table transversely to properly position the work with respect to the operating tool. The vertical adjusting means for the knee 11 and the means for adjusting the work table transversely as herein disclosed are purely conventional and likewise constitute no essential part of the present improvement.

From the foregoing description considered in connection with the accompanying drawings, it will be seen that in a very compact organization of the several parts, I have devised a machine which may be used as a standard turning or engine lathe, as a horizontal milling machine, a vertical milling machine, or a drill press, and the power for operating the several instrumentalities is obtained from a single driving shaft. In addition, the bed of the lathe is provided adjacent the head stock 8 with a removable or detachable section 89, shown in Fig. 5, which is provided at opposite sides with rail portions 90 for the traveling carriage 17 adapted to accurately align with the rails 19 of the body of the lathe bed when said section is secured in place. In Figure 1 of the drawings, this gap section 89 has been removed from the lathe and the carriage 17 is at substantially the limit of its movement towards the head stock. With the gap section removed a work supporting plate or disc 91 may be attached to the main driving shaft or spindle.

In the practical use of the machine, work may be turning in the lathe and at the same time, a milling operation carried on by the application of the supporting rod 61 and the horizontal arbor 59, or, these parts may be removed and a vertical milling cutter connected to the lower end of the shaft or spindle 44, or, the lathe and the drill press may be operated simultaneously by attaching the drill indicated at 92 in Figure 3 to the lower end of the shaft or spindle 44 and securing the work supporting plate 93 upon the table 64. As the drilling operation progresses, the drill may be lowered by operating the hand wheel 55 or the lever 51.

It will thus be seen that I have produced a combination metal working machine of maximum utility, and which will occupy far less floor space than would be the case if separate and distinct machines are provided each with its own driving mechanism as required for the several operations above referred to, as has heretofore been the case. At the same time, it will be appreciated that the present invention is relatively simple in the construction and arrangement of its several parts, and, therefore, not likely to get out of order and require frequent repair.

While I have herein shown and described the preferred construction and arrangement of the several elements, it will nevertheless be understood that the machine is susceptible of considerable modification and I accordingly reserve the privilege of adopting all such legitimate changes as may be fairly embodied within the spirit and scope of the invention as claimed.

I claim:

1. In a metal working machine of the character described, a correlated drilling mechanism, a lathe mechanism and milling mechanism, including a spindle, a step driven pulley mounted on said spindle, a driving gear mounted in said spindle for operating the drilling, lathe and milling mechanisms, two gears mounted on said spindle, a shaft adjacent the spindle and speed varying gears keyed on the shaft and adapted to mesh with the gears on the spindle.

2. In a metal working machine of the class described, correlated drilling mechanism, lathe mechanism and milling mechanism including a spindle, a step driven pulley mounted on the spindle, a driving gear mounted on the spindle gears mounted on said spindle, speed varying gears engaging said gears, an auxiliary shaft provided with a gear engaging the driving gear of said spindle and provided with a beveled gear operating portions of said drill mechanism and milling mechanism.

3. In a metal working machine of the class described, correlated drilling mechanism, lathe mechanism and milling mechanism including a spindle, a step driven pulley mounted on said spindle, a driving gear carried by the spindle gears mounted on said spindle, speed varying gears engaging said gears carried by the spindle, an auxiliary shaft provided with a gear engaging said main driving gear, said shaft being also provided with a beveled gear, a vertically disposed sleeve having a beveled gear engaging the beveled gear of said auxiliary shaft and provided with clutch teeth, a vertically disposed shaft having a sleeve provided with clutch teeth slidingly mounted thereon, a drill shaft provided with a beveled gearing and a connecting shaft having beveled gears engaging the gear of said drill shaft and a gear on the upper end of said vertical shaft.

4. In a metal working machine of the class described, correlated drilling mechanism, lathe mechanism and milling mechanism, including a spindle, a step driven pulley mounted on said spindle, a driven gear carried by the spindle gears mounted upon said spindle, speed varying gears engaging said back gears, and an auxiliary shaft provided with a gear engaging said driving gear, a lead gear shaft on said lathe and provided with a gear and a train of gear connecting the gear of said lead shaft with the gear of said auxiliary shaft.

5. In a metal working machine of the class described, correlated drilling mechanism, lathe mechanism and milling mechanism including a spindle, a step driven pulley mounted on said spindle, a driven gear carried by the spindle gears mounted on said spindle, speed varying gears engaging said gears, an auxiliary shaft provided with a gear engaging said driving gear, a reversing gear shaft provided with a driven gear, and an arm loosely mounted upon said shaft and provided with gears engaging said driven gear and selectively engaging the gear of said auxiliary shaft, a lead screw mounted on said lathe and provided with a gear, and intermediate gears connecting said lead screw gear with a gear mounted upon the end of said speed varying gear shaft.

6. In a metal working machine of the class described, correlated drilling mechanism, lathe mechanism and milling mechanism including a spindle, a step driven pulley mounted on the spindle, a driving gear carried by the spindle gears mounted upon said spindle, speed varying gears engaging said gears, an auxiliary shaft having a gear mounted thereon engaging the driven gear of said spindle and having a beveled gear, means for moving the work bed of a milling machine longitudinally upon a cross slide cooperatively connected with a beveled gear on said auxiliary shaft.

7. In a metal working machine of the class described, a lathe operating mechanism including a spindle and a step pulley mounted on said spindle, speed changing gears on said spindle, a main drill and vertical milling machine operating mechanism and a horizontal milling machine operating mechanism, and means connected with said mechanisms and with said spindle for operating said several mechanisms simultaneously.

8. In a metal working machine of the class described, co-related drilling mechanism, lathe mechanism, and milling mechanism including a spindle, a step driven pulley mounted on said spindle for operating the drilling mechanism and the lathe, a driving gear mounted on the spindle, two gears mounted on said spindle, and speed varying gears mounted on an eccentric shaft, whereby they may be moved in and out of engagement with the gears on the spindle.

9. In a metal working machine of the character described, a co-related drilling mechanism, a lathe mechanism, a milling mechanism including a spindle, a driven pulley mounted on said spindle, a driving gear mounted on said spindle, for operating the drilling mechanism and the lathe, two spaced gears mounted on said spindle, an eccentric shaft adjacent the spindle, and speed varying gears keyed on the shaft and adapted to mesh with the gears on the spindle, whereby the two gears may be moved in and out of engagement with the gears on the spindle.

In testimony that I claim the foregoing as my invention I have signed my name hereunder.

HUBERT DALTON.